Figure 1:
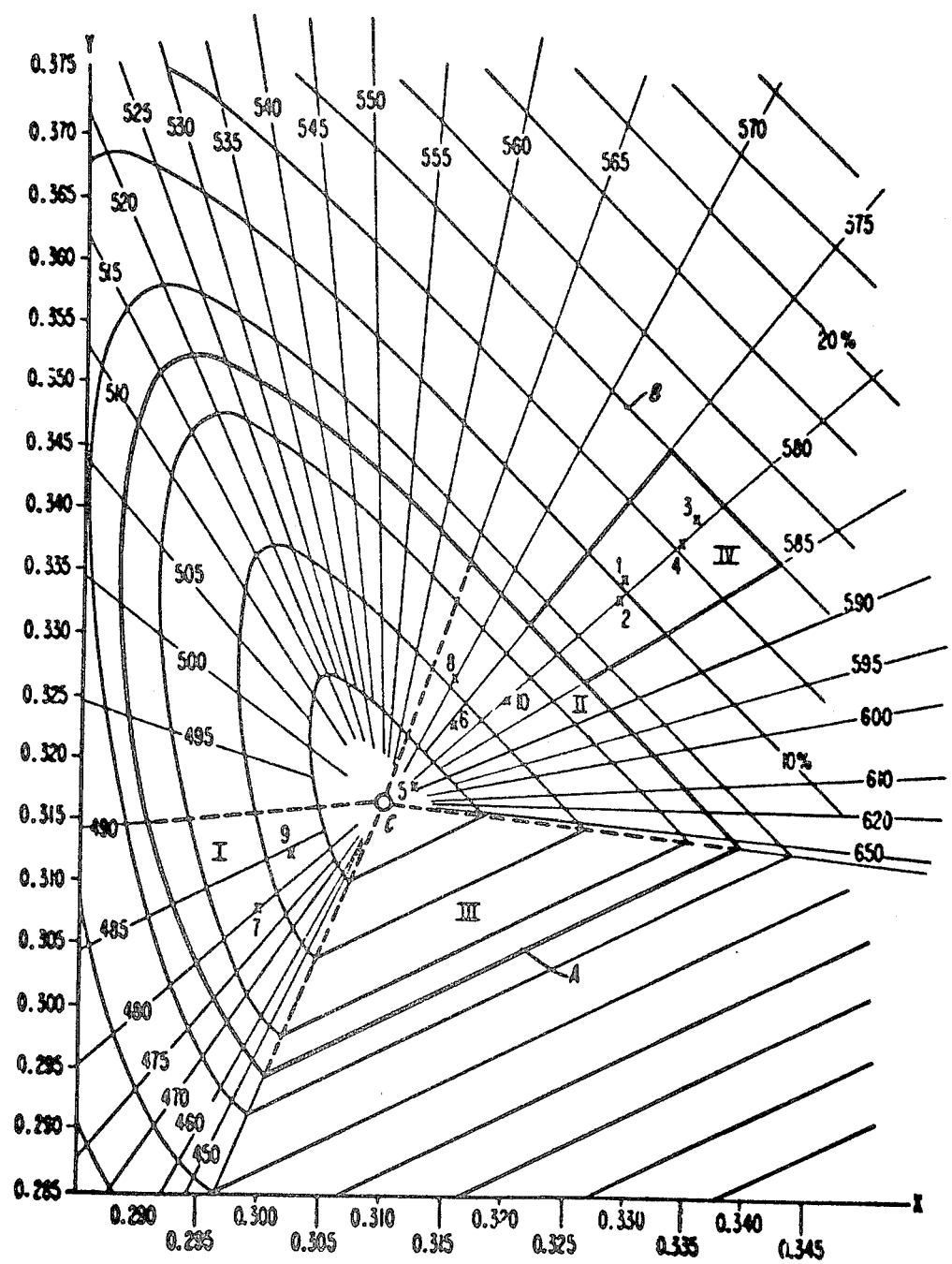
Figure 2:
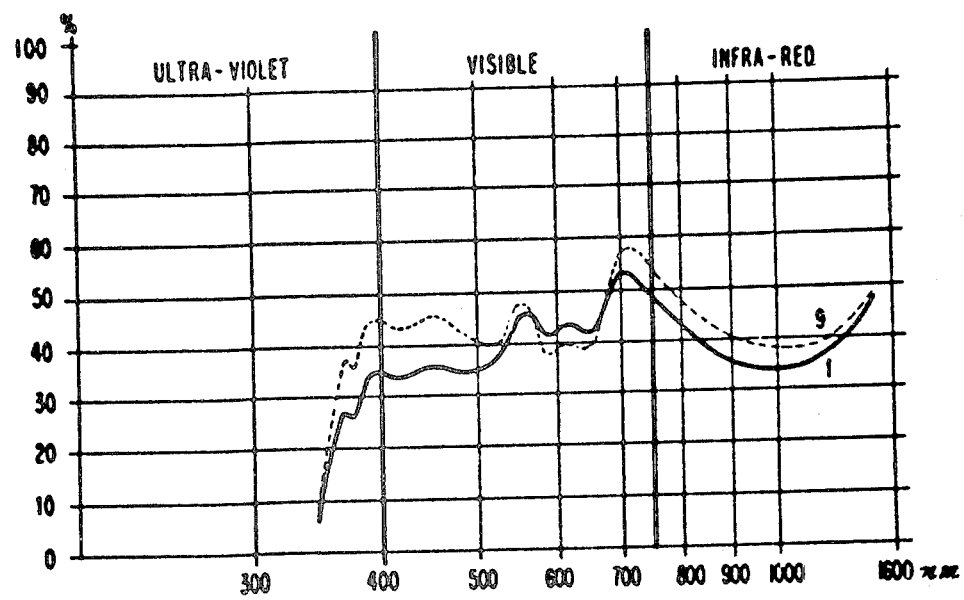
Figure 3:
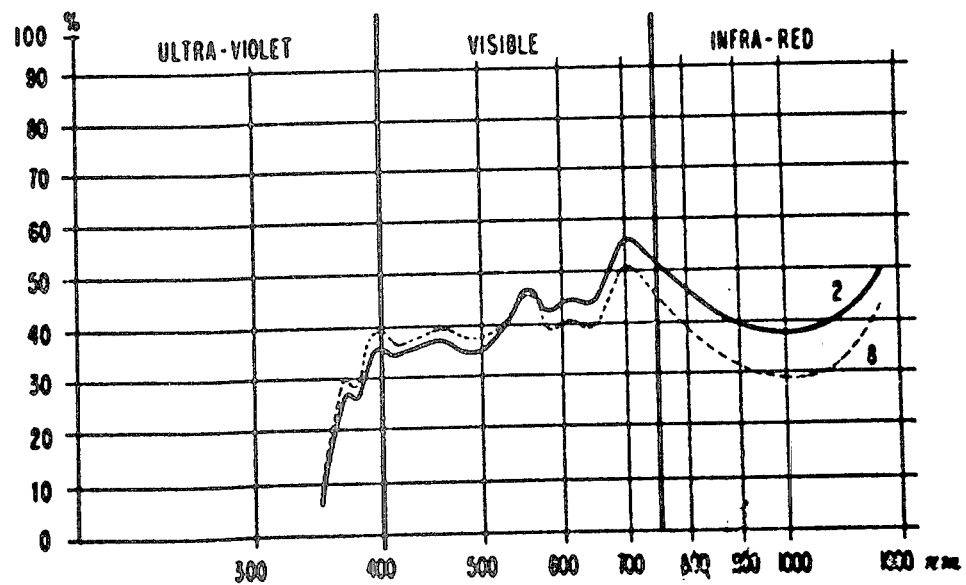
Figure 4:
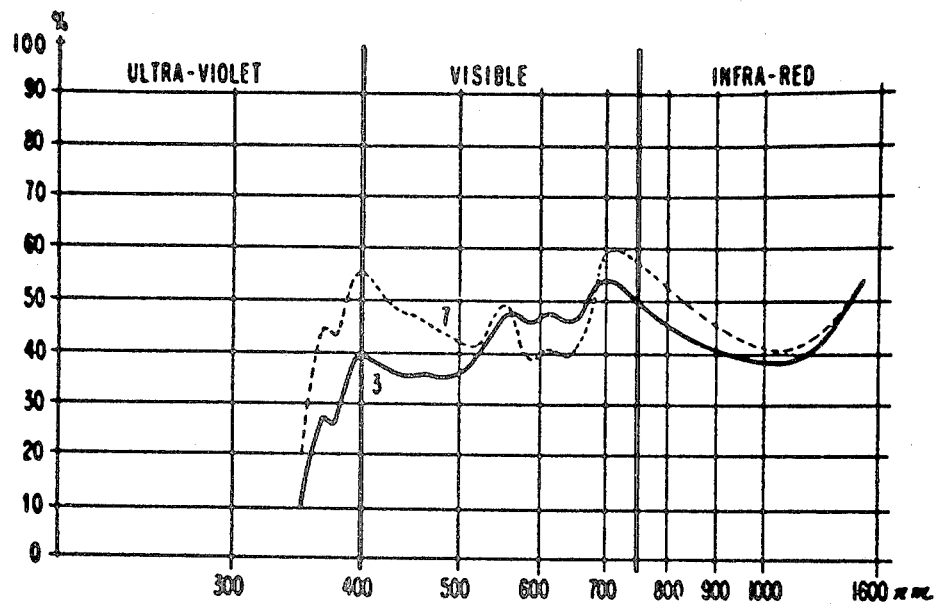

United States Patent [19]

Pons

[11] 4,104,076

[45] Aug. 1, 1978

[54] MANUFACTURE OF NOVEL GREY AND BRONZE GLASSES

[75] Inventor: André Pons, Villejuif, France

[73] Assignee: Saint-Gobain Industries, Neuilly-sur-Seine, France

[21] Appl. No.: 721,509

[22] Filed: Sep. 8, 1976

Related U.S. Application Data

[63] Continuation of Ser. No. 495,218, Aug. 6, 1974, abandoned, and a continuation of Ser. No. 124,240, Mar. 15, 1971, abandoned.

[30] Foreign Application Priority Data

Mar. 17, 1970 [FR] France .................................. 70.09441

[51] Int. Cl.$^2$ ........................... C03C 3/08; C03C 3/04
[52] U.S. Cl. .................................... 106/52; 106/54
[58] Field of Search .............................. 106/52, 54

[56] References Cited

U.S. PATENT DOCUMENTS

| | | | |
|---|---|---|---|
| 2,524,719 | 10/1950 | Tilly | 106/52 |
| 2,902,377 | 9/1959 | Duncan | 106/52 |
| 2,938,808 | 5/1960 | Duncan et al. | 106/52 |
| 3,296,004 | 1/1967 | Duncan | 106/52 |
| 3,300,323 | 1/1967 | Plumat et al. | 106/52 |
| 3,466,180 | 9/1969 | Hagedorn et al. | 106/52 |
| 3,723,142 | 3/1973 | Kato et al. | 106/52 |

OTHER PUBLICATIONS

Norton, F. H.; "Color Formation in Glosses & Glazes", in Elements of Ceramics; Cambridge, Mass. 1952, pp. 192–194.

*Primary Examiner*—Winston A. Douglas
*Assistant Examiner*—Mark Bell
*Attorney, Agent, or Firm*—Pennie & Edmonds

[57] ABSTRACT

A method of making heat absorbing glass which comprises melting the raw materials of ordinary silica-soda-lime glass and incorporating therein during melting a quantity of the tinting agents $Fe_2O_3$, $CoO$, $Se$, $UO_2$ and $Cr_2O_3$ sufficient to produce in a piece 2-12 mm. thick a purity of excitation less than 14%, a total transmission of solar energy less than 50%, and a factor of luminance Y between 35 and 55%, and shaping articles therefrom.

4 Claims, 5 Drawing Figures

MANUFACTURE OF NOVEL GREY AND BRONZE GLASSES

This is a continuation, of applications Ser. Nos. 124,240 and 495,218 filed Mar. 15, 1971, and Aug. 6, 1974, respectively both of which are abandoned.

This invention relates to glass which protects against heat. As the invention is particularly valuable in the making of flat glass for windows it will be described in that use but it is to be understood that it has many other uses, for example in in manufacture of bottles which are to contain I.R.-sensitive materials.

Generally speaking the color of a body is defined by its spectral curve of transmission. When we are concerned with the observation of a transparent body such as a window that curve is understood as the spectral curve of transmission. As the appearance of a body is derived from the conditions of light in which it stands it is useful to introduce colorimetric notions which take such conditions into consideration and in so doing it is useful to relate to the standards established in 1931 by CIE, choosing as the source of illumination the light C which occupies a fixed position in the diagram of colors and represents white.

In the CIE system the color of a body under study is determined by the trichromatic coordinates $x$ and $y$ and the factor of luminance Y; the trichromatic coordinates $x$ and $y$ may be expressed in the form of a purity of excitation Pe associated with a dominant wave length $\lambda$ D. On the accompanying drawings I have shown the colorimetric part of the diagram as $x$ and $y$ which are found near illuminant C; each of the lines of the diagram which radiate from point C corresponds to a dominant wave length of which the value is indicated in nanometers as in FIG. 1. On the other hand the closed lines which surround the point C are curves of constant purity. Point C is characterized by zero purity and has no dominant wave length. The curve of constant purity nearest to point C represents a purity of 2%, the second curve has a purity of 4% and so on as they are the farther from C.

If the spectral curve of transmission of a transparent substance presents a horizontal aspect in the whole range of the visible that substance is called neutral grey. In the CIE system it has no dominant wave length, its factor of purity is zero, and its coordinates $x$ and $y$ are those of point C, the reference white.

By extension one may consider a body as grey which has a spectral curve which is relatively flat in the visible range. Such feeble bands of absorption as appear allow us to characterize this body by the color of its dominant wave length and, for that dominant, a purity other than zero but which is very small and on the order of a few percent. One may, for example apply the term grey to a body of which the departure from purity, regardless of the dominant, does not exceed 7%. The figurative points of the color of a body will be situated within an area bounded by the curve A (factor of purity 7%) in FIG. 1. Outside that area, whatever may be the dominant, the purity will be such that the body is no longer called grey but colored.

For architectural uses it is highly desirable that the purity of a protective colored window shall not be too high in order to retain a relative neutrality in the luminous ambiance transmitted. In general, except in special cases, the purity of window glass for use in buildings should be limited to 14%, which is shown in curve B of FIG. 1. It is also advisable in window glass to eliminate a high proportion of solar energy so as to improve the comfort of dwellings, especially in hot countries. In order to satisfy this requirement and to be recognized as a heat absorbing glass under American standards glass 6.2 mm. thick should transmit less than 50% of the solar energy.

The factor of luminance Y should not be so strong, in order to prevent brightness, as to limit the desired protection but it should not be too small if it is to preserve an agreeable aspect and to admit enough light in cloudy weather. In general the factor of luminance is chosen between 35 and 45% in grey glasses (purity below 7%) and between 40 and 55% for tinted glasses having purity between 7 and 14% as in bronze glass.

The glasses of this invention have a common group of characteristics of spectral transmission which on one hand conform to the conditions specified above and on the other hand yield a satisfactory range of colors. The concept of solar yield has not yet been completely standardized but it is readily seen for example that, esthetically, a window ought not to denature the appearance of a green field seen through it. In the case of green, the yield of green is obtained by adding to the curve of transmission of the window a secondary maximum, more or less accentuated, which is located between 550 and 565 nm. Yellow-green is located at 555 nm. and medium green at about 520 nm. while the sensitivity of the eye is around 0.710 at 520 nm.; 0.954 at 540 nm. and 0.995 at 560 nm. The great importance of these secondary maxima is very important to the transmission of green. Similar principles apply to other colors.

FIGS. 1 to 5 are diagrams, the significance of which is explained elsewhere in the body of the specification.

It is to be noticed that the yield of colors may be modified by changing the coloring agents without changing the trichromatic coordinates of the glass product. This result is not paradoxical if one comprehends the fact that these coordinates are obtained by making a series of summations from the curves of transmission and that one may produce coordinates of the same value from two curves of transmission which are sufficiently close to be superposable.

The curves of transmission of the novel glasses are fixed by the combined absorption of all the coloring agents present. According to the nature and the relative concentration of the different coloring agents a relatively flat curve of transmission in the visible spectrum is produced, but nonetheless containing one or more of the secondary maxima necessary to the esthetic point of view, especially to the restoration of the greens. There is thus produced a grey glass whatever may be the wave length $\lambda$ D of the dominant color, if the purity is below 7%, and a colored glass is produced, e.g. a bronze glass, if the purity is between 7 and 14% with a wave length of the dominant color between 575 and 585 nm.

Heretofore the coloring agents used to make absorbent tinted glass have been, principally, the oxides of iron, cobalt, and nickel together with some metallic selenium. Nickel oxide is inconvenient in that it is difficult to obtain and causes uncontrollable pollution in the melting furnace and consequently in the glasses made therein. Given the physico-chemical conditions existing in the furnaces, nickel oxide gives rise to drops of nickel sulfide which degrade the aspect of the glass, lower its mechanical resistance, and affect its breaking pattern when tempered.

The present invention overcomes these difficulties by making protective glasses containing iron oxide, cobalt oxide, and sometimes metallic selenium, but from which nickel oxide is omitted and replaced by either or both chromium oxide and uranium oxide. These coloring agents are introduced into glass of the types called silica-soda-lime, of which a general formula is as follows:

60 to 75% $SiO_2$ by weight
0 to 7% $B_2O_3$
0 to 5% $Al_2O_3$
10 to 20% $Na_2O$
0 to 10% $K_2O$ (with 10 to 20% of $K_2O + Na_2O$)
0 to 16% $CaO$
0 to 10% $MgO$ (with $CaO + MgO$ between about 6 to 18%)

The glasses thus made will receive amounts of coloring agents as follow:

$Fe_2O_3$: 0.20 to 1.5% by weight
$CoO$: 0.0010 to 0.0300%
$Se$: 0 to 0.0200% (determined in the finished glass)
$Cr_2O_3$: 0 to 0.0200%
$UO_2$: 0 to 0.2500% the sum $Cr_2O_3 + UO_2$ being between 0.0010 and 0.2500%.

The exact percentage of colors to be used will depend on the thickness of the glass sheet produced from the melt and the characteristics of transmission and color (e.g. grey or bronze) desired. In modifying the percentages of the different coloring agents the desired curve of transmission is produced in the visible range of the spectrum and particularly the dominant wave length and the desired degree of purity for that wave length. Generally, iron presents itself in the glass in two ionic forms in equilibrium, $Fe^{II}$ and $Fe^{III}$ of which the proportion is fixed by the matrix of the base glass and by the working conditions in the melting furnace (atmosphere oxido-reductive and temperature). Each form of Fe has its own properties:

$Fe^{II}$ absorbs in the infrared and some of it is needed to absorb heat and satisfy the demands of architects. The FeO content of glass 6 mm. thick should be above 0.06% by weight to comply with normal requirements of these types.

$Fe^{III}$ absorbs in the ultra violet and has only a negligible effect on color.

CoO introduces a blue-violet dominant and absorbs strongly in the visible spectrum.

Selenium forms a chromophore with ferrous oxide which produces an orangey dominant and absorbs the visible rays strongly.

Chromium oxide introduces a green dominant and absorbs in the midpart of the visible spectrum.

Uranium oxide produces a yellow-green dominant and feeble absorption in the visible.

This composition, eliminating nickel oxide and introducing the oxides of chromium and uranium provides the glassmaker with great and enlarged flexibility of operation and a wider selection of tints.

In the extensive family of glasses which can be prepared by varying the proportions of the different coloring agents within the limits defined above, I have established several types of optical qualities of which the tints are very agreeable to the eye and provide the comfort necessary to the light transmitted by a window. On the diagram of FIG. 1 these types are numbered I, II, III, and IV. Type I is within the boundaries λ D 400 and 490 nm. Type II is within the boundaries λ D 565 and 700 nm. Type III is in region of purples. Type IV is within the boundaries λ D 575 and 585 nm. Types I, II, III are greys; type IV are bronzes. The greys have a factor of purity below about 7 and the bronzes a factor between 7 and 14.

To produce grey glasses I, II, III having a factor of luminance Y between 35 and 45% and purity below 7% the following proportions of coloring agents are permissible:

$Fe_2O_3$: 0.2 to 1% by weight
$CoO$: 0.0030 to 0.0300%
$Se$: 0 to 0.0100%
$Cr_2O_3$: 0 to 0.0200%
$UO_2$: 0 to 0.2500% with $UO_2$ and $Cr_2O_3$ between 0.0030 and 0.2500%

To produce the bronze glasses of type IV with a factor of luminance Y between 40 and 556 and a purity between 7 and 14% the same coloring agents are used but in the following amounts.

$Fe_2O_3$: 0.2 to 1.5% by weight
$CoO$: 0.0010 to 0.0200%
$Se$: 0.0015 to 0.0200%
$Cr_2O_3$: 0 to 0.0100%
$UO_2$: 0 to 0.1500%, the total of $UO_2$ and $Cr_2O_3$ lying between 0.0010 and 0.1500%.

To prepare these glasses one may use any of the glasses ordinarily used in making flat glass and hollow glass. Such glasses are called silica-soda-lime glasses or equivalent terms. In adding the coloring agents the regard is paid to the thickness of the glass so as to produce selected and desirable properties of optics and appearance by judicious selection of the coloring agents and their quantities. For given optical properties the concentration for a given thickness of glass is approximately constant for each coloring agent within the limits stated.

The vitrifiable mixture of raw materials for a glass containing selenium should be free of carbon and can include agents which oxidize at low temperature such as sodium nitrate, their action being beneficial as to the quantity of selenium retained in the final product. The vitrifiable mixtures may, additionally, include some melting agents containing e.g. fluorine or boron to increase the yield of selenium.

The coloring agents may be mixed with the raw materials which are to be melted, or they may be mixed with a part only of the principal ingredients of the glass, or they may be introduced as frit or in molten glass. They can be added at any stage of the melting process which allows them to be homogeneously distributed throughout the glass.

The following examples illustrate the glass of the invention without derogating from the generalities elsewhere herein expressed:

The table which follows records the chemical and colorimetric qualities of certain glasses of the invention. For each of them the table provides analysis, the corresponding raw materials and the colorimetric qualities derived from transmission curves which were registered with the aid of a spectrophotometer of Beckmann type DK 2A.

FIG. 1 gives the situation of each glass on the diagram of colors. FIGS. 2 to 5 show two curves, one for grey glass and another for bronze. The melting temperatures and techniques customary with silica-soda-lime glasses are not changed by this invention and may be used as prior good practice provides.

| No. of the Examples | 1 | 2 | 3 | 4 | 5 | 6 | 7 | 8 | 9 | 10 |
|---|---|---|---|---|---|---|---|---|---|---|
| | Bronze | Bronze | Bronze | Bronze | Grey | Grey | Grey | Grey | Grey | Grey |
| Composition in weight % | | | | | | | | | | |
| $SiO_2$ | 71.53 | 71.53 | 71.53 | 71.53 | 71.53 | 71.53 | 71.53 | 71.53 | 71.53 | 71.53 |
| $Na_2O$ | 13.57 | 13.57 | 13.57 | 13.57 | 13.57 | 13.57 | 13.57 | 13.57 | 13.57 | 13.57 |
| MgO | 3.10 | 3.10 | 3.10 | 3.10 | 3.10 | 3.10 | 3.10 | 3.10 | 3.10 | 3.10 |
| CaO | 11.60 | 11.60 | 11.60 | 11.60 | 11.60 | 11.60 | 11.60 | 11.60 | 11.60 | 11.60 |
| $Fe_2O_3$ | 0.3500 | 0.3500 | 0.3500 | 0.3500 | 0.2950 | 0.2950 | 0.2950 | 0.3500 | 0.2950 | 0.2950 |
| CoO | 0.0056 | 0.0056 | 0.0043 | 0.0057 | 0.0082 | 0.0072 | 0.0082 | 0.0056 | 0.0082 | 0.0082 |
| $Cr_2O_3$ | — | — | 0.0040 | 0.0085 | 0.0075 | 0.0075 | 0.0055 | — | — | — |
| $UO_2$ | 0.1020 | 0.1020 | — | — | — | — | — | 0.1020 | 0.1120 | 0.1120 |
| Se | 0.0010 | 0.0015 | 0.0021 | 0.0032 | 0.0030 | 0.0025 | 0.0021 | 0.0004 | — | 0.0022 |
| Vitrifiable mixture for 1000 kg. of glass | | | | | | | | | | |
| Sand | 718.2 | 718.2 | 718.2 | 718.2 | 718.2 | 718.2 | 718.2 | 718.2 | 718.2 | 718.2 |
| Sodium carbonate | 219 | 219 | 219 | 219 | 219 | 219 | 219 | 219 | 219 | 219 |
| Dolomite | 175 | 175 | 175 | 175 | 175 | 175 | 175 | 175 | 175 | 175 |
| Limestone | 99 | 99 | 99 | 99 | 99 | 99 | 99 | 99 | 99 | 99 |
| Sodium sulfate | 5 | 5 | 5 | 5 | 5 | 5 | 5 | 5 | 5 | 5 |
| Sodium nitrate | 15 | 15 | 15 | 15 | 15 | 15 | 15 | 15 | 15 | 15 |
| $Fe_2O_3$ | 3.250 | 3.250 | 3.250 | 3.250 | 2.700 | 2.700 | 2.700 | 3.250 | 2.700 | 2.700 |
| CoO | 0.056 | 0.056 | 0.043 | 0.057 | 0.082 | 0.072 | 0.082 | 0.056 | 0.082 | 0.082 |
| $Cr_2O_3$ | — | — | 0.040 | 0.085 | 0.075 | 0.075 | 0.055 | — | — | — |
| $UO_2$ | 1.156 | 1.156 | — | — | — | — | — | 1.156 | 1.269 | 1.269 |
| Se metalloidic | 0.0667 | 0.1000 | 0.1400 | 0.2140 | 0.2000 | 0.1670 | 0.1400 | 0.0267 | — | 0.1470 |
| Dominant wave length | | | | | | | | | | |
| λ D (mm.) | 579 | 580 | 579 | 580 | 587 | 577 | 480 | 570 | 484 | 580 |
| Purity Fe % | 10 | 10 | 13 | 12.2 | 1.5 | 3.2 | 4.75 | 4.2 | 3.1 | 5.0 |
| x | 0.3300 | 0.3295 | 0.3360 | 0.3347 | 0.3127 | 0.3160 | 0.2998 | 0.3158 | 0.3025 | 0.3206 |
| y | 0.3343 | 0.3328 | 0.3391 | 0.3372 | 0.3176 | 0.3227 | 0.3076 | 0.3260 | 0.3122 | 0.3245 |
| y in % | 41.58 | 41.78 | 44.57 | 40.13 | 40.95 | 43.26 | 44.04 | 40.99 | 42.63 | 38.76 |

Example 1 produced a bronze glass containing $Fe_2O_3$, CoO, Se $UO_2$ as coloring agents, its optical characteristics were located in the middle of the chosen range despite its small Se content. See FIG. 2 for its transmission curve.

Example 2. This glass is similar to that of Example 1 both chemically and optically. Its curve of transmission is in FIG. 3.

Example 3. This is a bronze glass containing $Fe_2O_3$, CoO, Se, and $Cr_2O_3$. Its optical qualities are near the limit of its chosen range. See FIG. 4.

Figure 5:
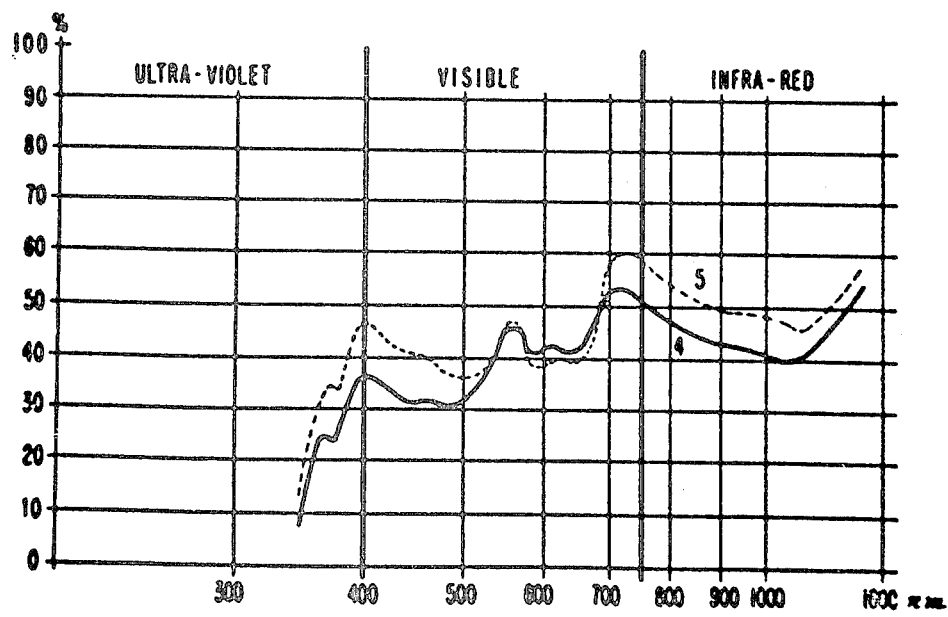

Example 4. This glass has a strong content of chromium oxide which favors a reduction in luminance as shown in FIG. 5, the transmission curve.

Example 5. The glass is grey, containing $Fe_2O_3$, CoC, Se, and $Cr_2O_3$. It is optically regarded as colorimetrically neutral. (See FIG. 5, the transmission curve.)

Example 6. This is a grey glass. It is found in the central zone of greys with a hot dominant.

Example 7. This contains the same four tinting agents as Example 6 and is found in the central zone of greys of cold dominant. See the transmission curve of FIG. 4.

Example 8. This glass is a grey containing $Fe_2O_3$, CoO, Se, and $UO_2$. It has a dominant which is remote from classical types. See the transmission curve of FIG. 3.

Example 9. This glass is a grey containing $Fe_2O_3$, CoO, Se, and $UO_2$. It is found in the central zone of greys of cold dominant. See FIG. 2, the transmission curve.

Example 10. The glass of Example 10 is a grey containing $Fe_2O_3$, CoO, Se, and $UO_2$. It is located in the zone of greys of hot dominant in a place almost symmetrical with that of glass 7 with respect to point C.

The curves of Examples 2–5 are deemed to be relatively flat in the visible range because between 400 and 750 nm. the transmission is kept within the range of about 35 to 60%, although in reality the curves have in that region several maxima which one may call secondary maxima.

In accordance with the present invention, a silica-soda-lime glass is produced having the optical characteristics, for a glass thickness of about 2 to 12 mm, in pieces of approximately uniform section Length of dominant wave: D(nm.) about 480 to 587,
Purity Pe% : about 3.1 to 13,
x: about 0.2998 to 0.3360,
y: about 0.3076 to 0.3391,
Y in %: about 40.13 to 44.57.

These glasses have the advantages that they absorb heat, transmit the visible spectrum agreeably, interrupt ultra violet and infrared, can be made by standard melting processes, provide a family of valuable glasses in the grey and tinted types which can be prepared to counteract varying conditions of use, eliminate the use of nickel and substitute better compositions for those including that element, extend the number of glasses available, and require no special training or techniques either to make or to use.

For an introduction to this subject reference may be had to the following authorities:

"Glass Industry" August 1970, p. 351 et seq.
Hardy "Handbook of Colorimetry" 1936 MIT Press
Judd and Wyszelki "Color in Business" 1963 Wiley
MacAdam "Journal of Optical Society of America" 1963 p. 107

As many apparently widely different embodiments of the present invention may be made without departing from the spirit and scope thereof, it is to be understood that the invention is not limited to the specific embodiments.

What is claimed is:

1. A tinted silica-soda-lime glass consisting in its essential elements, by weight percent, of: $SiO_2$ 60–75%, $B_2O_3$ 0–7%, $Al_2O_3$ 0–5%, $K_2O$ + $Na_2O$ 10–20% of which $K_2O$ is 0–10%, CaO + MgO 6–18% of which CaO is 0–16% and MgO is 0–10%, and containing by weight percent of tinting agents: $Fe_2O_3$ 0.2–1.5%, CoO 0.0010–0.0300%, Se 0–0.0200%, and $Cr_2O_3$ 0.0010–0.0200%.

2. A tinted glass according to claim 1 in which the content of said tinting agents in the glass is such as to produce a purity of excitation less than 14%, a total transmission of solar energy less than 50%, and a factor of luminance Y between 35 and 55% for a thickness of the glass of about 2 to about 12 mm.

3. A tinted bronze glass having the glass content of claim 1 and the tinting agents: $Fe_2O_3$ 0.2–1.5%, CoO 0.0010–0.0200%, Se 0.0015–0.0200%, $Cr_2O_3$ 0.0010–0.0100%.

4. Glass according to claim 3 in which a content of tinting agents such as to produce in glass 2–12 mm. thick a purity of excitation between 7 and 14%, a factor of luminance Y between 40 and 55%, and a wave length dominant between about 575 and 585 nm.

* * * * *